(12) United States Patent
Kobori et al.

(10) Patent No.: US 8,860,436 B2
(45) Date of Patent: Oct. 14, 2014

(54) SENSOR OF ELECTROMAGNETIC INDUCTION TYPE COORDINATE INPUT DEVICE

(71) Applicant: Wacom Co., Ltd., Saitama (JP)

(72) Inventors: Takeshi Kobori, Ibaraki (JP); Daisuke Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 134 days.

(21) Appl. No.: 13/763,323

(22) Filed: Feb. 8, 2013

(65) Prior Publication Data

US 2013/0234730 A1    Sep. 12, 2013

(30) Foreign Application Priority Data

Mar. 9, 2012 (JP) ................................ 2012-052683

(51) Int. Cl.
*G01R 27/28* (2006.01)
*G01B 7/004* (2006.01)
*G06F 3/046* (2006.01)

(52) U.S. Cl.
CPC .............. *G01B 7/004* (2013.01); *G06F 3/046* (2013.01)
USPC ........................................ 324/654

(58) Field of Classification Search
USPC ............... 324/654, 600, 200, 546, 425, 445, 324/207.15, 76.57
See application file for complete search history.

(56) References Cited

U.S. PATENT DOCUMENTS 5,763,839 A * 6/1998 Funahashi et al. ............ 177/147
8,395,598 B2 * 3/2013 Oda et al. ..................... 345/174

FOREIGN PATENT DOCUMENTS

JP            5127803 A      5/1993

* cited by examiner

*Primary Examiner* — Melissa Koval
*Assistant Examiner* — Trung Nguyen
(74) *Attorney, Agent, or Firm* — Seed IP Law Group PLLC (57) ABSTRACT

In an electromagnetic induction type coordinate input device, on a substrate, plural first loop coils including loop portions are disposed in a first direction, and plural second loop are disposed in a second direction. The first and second loop coils include extraction line portions, each composed of a first line and a second line that are in parallel and are continuously connected to corresponding ones of the first and second loop coils. One of the first line or the second line of the first loop coil is connected to at least one of: (i) the first line or the second line of another one of the first loop coils, and (ii) a line of the loop portion of a second loop coil, within a position detection area, to form a common extraction line with (i) and/or (ii), to thereby reduce the overall number of extraction lines disposed on the substrate.

9 Claims, 8 Drawing Sheets

SENSOR OF ELECTROMAGNETIC INDUCTION TYPE COORDINATE INPUT DEVICE

CROSS-REFERENCE TO RELATED APPLICATION(S)

The present application claims priority under 35 U.S.C. 119(a) of Japanese Application No. 2012-052683, filed Mar. 9, 2012, the entire content of which is incorporated herein by reference.

BACKGROUND OF THE INVENTION

1. Field of the Invention

The present invention relates to a sensor of an electromagnetic induction type coordinate input device, and more particularly to a pattern formation of loop coils formed on a substrate in the sensor of an electromagnetic induction type input device.

2. Description of the Related Art

An electromagnetic induction type coordinate input device is composed of a sensor in which a large number of loop coils are disposed in an X-axis direction and in a Y-axis direction in coordinate axes, and a position indicator having a resonance circuit consisting of a coil and a capacitor. Thus, the electromagnetic induction type coordinate input device detects coordinate values of the X-axis direction and the Y-axis direction of a position indicated by the position indicator on the basis of electromagnetic induction between the position indicator and the sensor.

Figure 9:
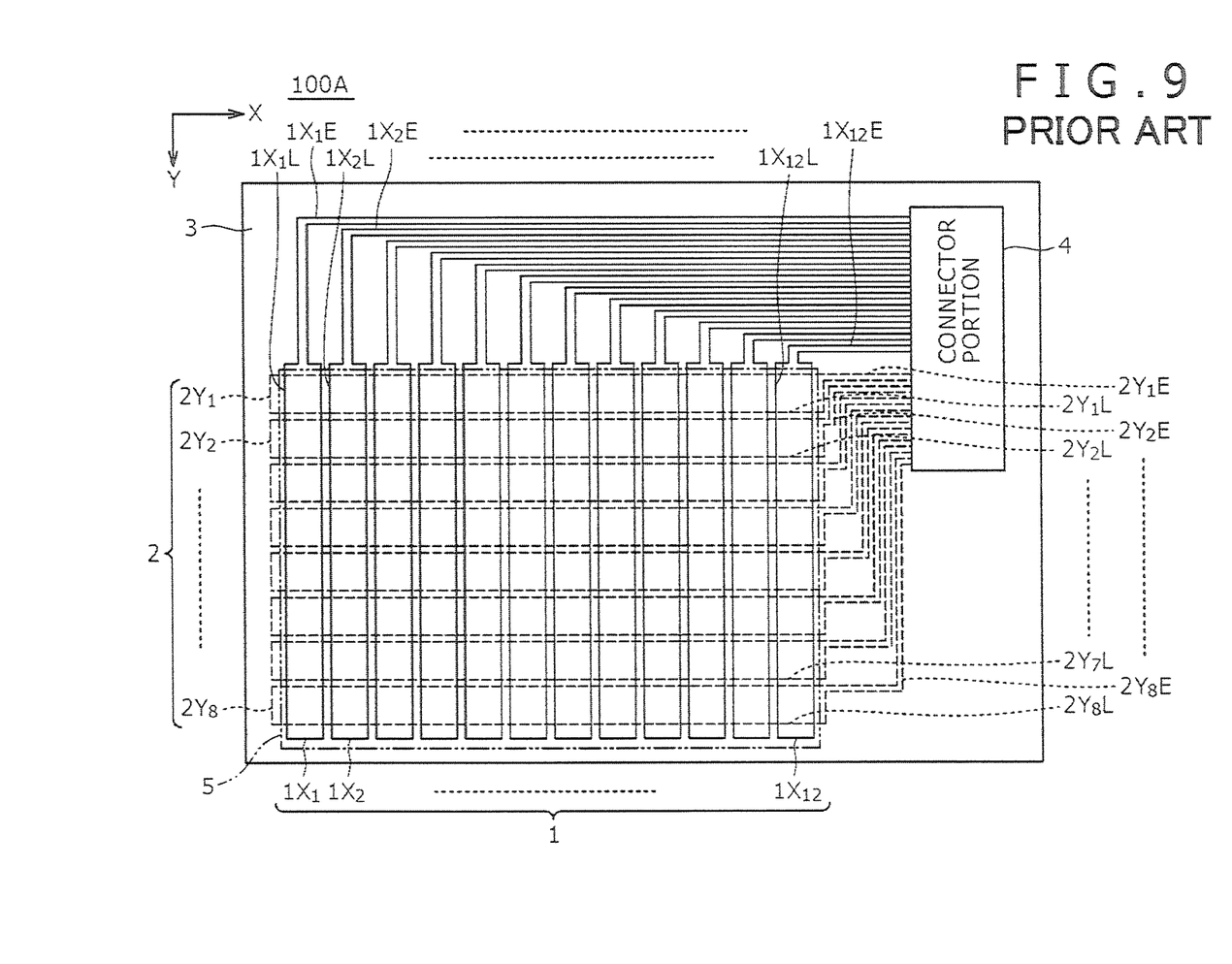
FIG. 9 is a top plan view showing an example of a configuration of a conventional sensor of an electromagnetic induction type coordinate input device.

FIG. 9 is a top plan view showing an example of a structure of a conductor pattern in a conventional sensor of a coordinate input device. In a sensor 100A of this example, a loop coil group 1 in the X-axis direction (for example, in a transverse direction of a substrate 3) is formed on one surface of the substrate 3, and a loop coil group 2 in the Y-axis direction (for example, in a longitudinal direction of the substrate 3) is formed on the other surface on a side opposite to the one surface of the substrate 3.

In the example shown in FIG. 9, the loop coil group 1 in the X-axis direction is composed of 12 X-axis direction loop coils $1X_1$ to $1X_{12}$. The X-axis direction loop coils $1X_1$, $1X_2$, ..., $1X_{12}$ are composed of loop portions $1X_1L$, $1X_2L$, ..., $1X_{12}L$ which surround elongated rectangular areas in the Y-axis direction, respectively, and extraction line portions $1X_1E$, $1X_2E$, ..., $1X_{12}E$ which are continuously connected to the loop portions $1X_1L$, $1X_2L$, ..., $1X_{12}L$, respectively.

Also, the 12 X-axis direction loop coils $1X_1$ to $1X_{12}$ are disposed in such a way that the loop portions thereof $1X_1L$ to $1X_{12}L$ are arranged in the X-axis direction, and are formed in such a way that the extraction line portions thereof $1X_1E$ to $1X_{12}E$ extend individually in the Y-axis direction from the loop portions $1X_1L$ to $1X_{12}L$, respectively. Also, each of the extraction line portions $1X_1E$ to $1X_{12}E$ is bent at a right angle in the X-axis direction so as to be connected to a connector portion 4.

In addition, in the example shown in FIG. 9, the Y-axis direction loop coil group 2 is composed of eight Y-axis direction loop coils $2Y_1$ to $2Y_8$. The Y-axis direction loop coils $2Y_1$, $2Y_2$, ..., $2Y_8$ are composed of loop portions $2Y_1L$, $2Y_2L$, ..., $2Y_8L$ which surround elongated rectangular areas in the X-axis direction, respectively, and extraction line portions $2Y_1E$, $2Y_2E$, ..., $2Y_8E$ which are continuously connected to the loop portions $2Y_1L$, $2Y_2L$, ..., $2Y_8L$, respectively.

Also, the eight X-axis direction loop coils $2Y_1$ to $2Y_8$ are disposed in such a way that the loop portions thereof $2Y_1L$ to $2Y_8L$ are arranged in the Y-axis direction, and are formed in such a way that the extraction line portions thereof $2Y_1E$ to $2Y_8E$ extend in the Y-axis direction from the loop portions $2Y_1L$ to $2Y_8L$, respectively. Also, each of the extraction line portions $2Y_1E$ to $2Y_8E$ is suitably bent at a right angle in the Y-axis direction and is bent in the Y-axis direction again so as to be connected to the connector portion 4.

It is noted that each of the extraction line portions $1X_1E$ to $1X_{12}E$ and the extraction line portions $2Y_1E$ to $2Y_8E$ is composed of two lines: a going line through which a signal is supplied or a signal is taken out; and a returning line which, for example, is connected to a reference electric potential, for example, a grounding electric potential.

In the sensor 100A in this example shown in FIG. 9, an area which is occupied by both of the loop portions $1X_1L$ to $1X_{12}L$ of the 12 X-axis direction loop coils $1X_1$ to $1X_{12}$, and the loop portions $2Y_1L$ to $2Y_8L$ of the eight Y-axis direction loop coils $2Y_1$ to $2Y_8$ becomes a position detection area 5 of a position indicated by the position indicator.

As shown in FIG. 9, the sensor 100A requires a large area which is occupied by both of the extraction line portions $X_1E$ to $X_{12}E$ and the extraction line portions $Y_1E$ to $Y_8E$ in the outside of the position detection area 5, which results in that a ratio of the dimension of the position detection area 5 to a total dimension of the substrate 3 becomes small. For this reason, for example, when the substrate 3 is accommodated in a chassis of an electronic apparatus in order to be used as a coordinate input device, there is caused a problem that a dimension of a coordinate input area becomes smaller than a dimension of the entire chassis.

In light of this problem, the patent applicant has previously provided an invention as described in Patent Document 1 of Japanese Patent No. 2842717 (official gazette), wherein on one sheet of substrate, an extraction line portion was formed within a position detection area and was also formed in a planar surface different from that of a loop portion, whereby a dimension of an area required for the extraction line portion is made small in the outside of the position detection area of a sensor.

Figure 10:
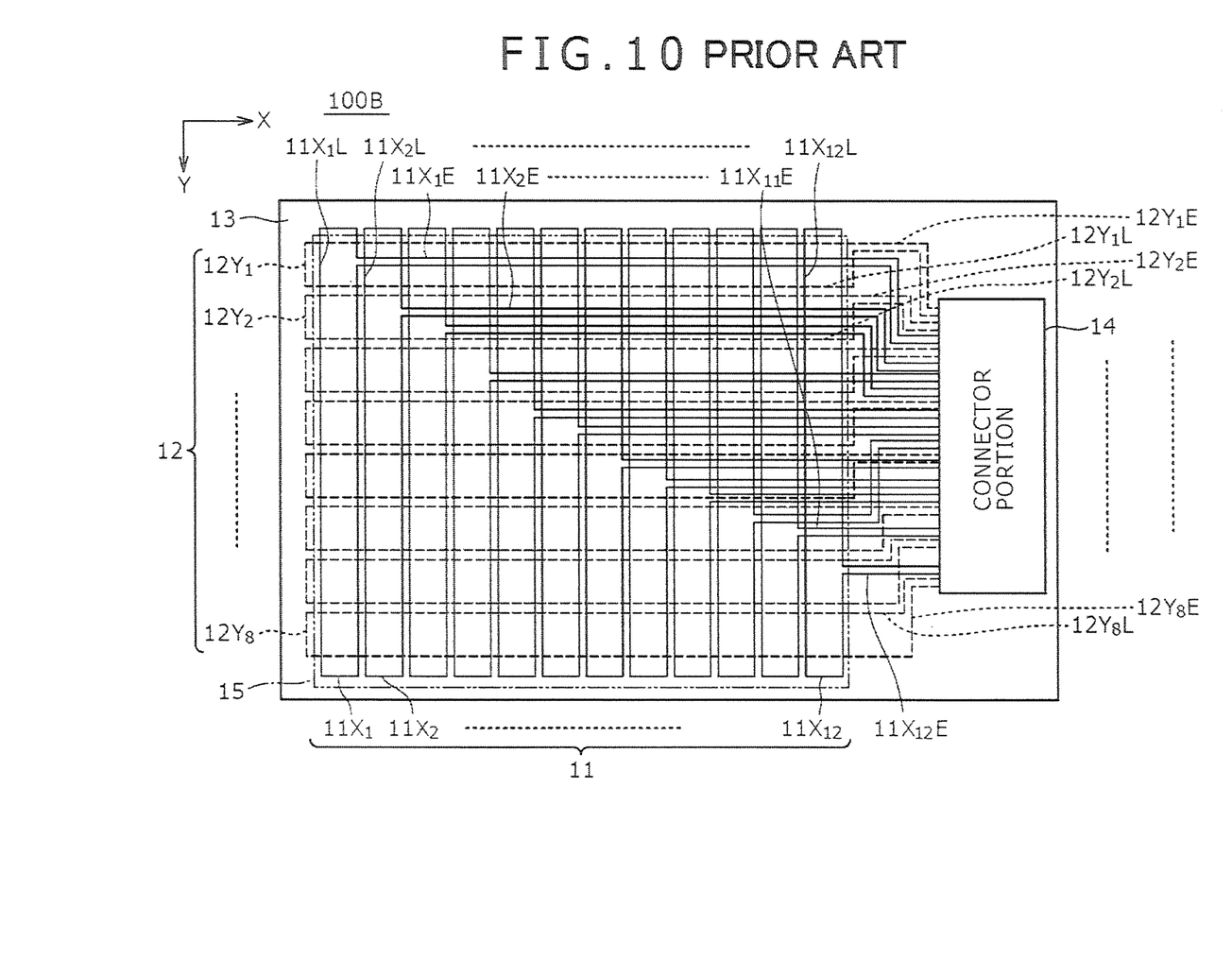
FIG. 10 is a top plan view showing another example of a configuration of a conventional sensor of an electromagnetic induction type coordinate input device.

FIG. 10 is a top plan view showing an example of a conductor pattern in a sensor 100B proposed in Patent Document 1 mentioned above. In the sensor 100B of this example shown in FIG. 10, a loop coil group 11 in the X-axis direction is formed on one surface of a substrate 13 having both of a front surface and a back surface, and a loop coil group 12 in the Y-axis direction is formed on a surface opposite to the one surface of the substrate 13.

The loop coil group 12 in the Y-axis direction is structured in the same manner as that in the loop coil group 2 in the Y-axis direction in the sensor 100A of the example shown in FIG. 9. However, in the loop coil group 11 in the X-axis direction, a structure of the extraction line portion thereof is different from the loop coil group 1 in the X-axis direction in the sensor 100A of the example shown in FIG. 9.

That is to say, as shown in FIG. 10, loop portions $11X_1L$ to $11X_{12}L$ of 12 X-axis direction loop coils $11X_1$ to $11X_{12}$ of the loop coil group 11 in the X-axis direction are formed on one surface of the substrate 13. On the other hand, extraction line portions $11X_1E$ to $11X_{12}E$ of the 12 X-axis direction loop coils $11X_1$ to $11X_{12}$ are formed within an area corresponding to a position detection area 15 on the other surface side of the substrate 13. In this case, the extension line portions $11X_1E$ to $11X_{12}E$ of the 12 X-axis direction loop coils $11X_1$ to $11X_{12}$ on the other surface side of the substrate 13 are connected to the loop portions $11X_1L$ to $11X_{12}L$ on one surface side of the substrate 13 via through holes (not shown), respectively.

As a result, since the extraction line portions $11X_1E$ to $11X_{12}E$ of the 12 X-axis direction loop coils $11X_1$ to $11X_{12}$ of the loop coil group 11 in the X-axis direction can be formed within the position direction area 15, a length of the substrate 13 in the Y-axis direction can be made shorter than that of the sensor 100A. For this reason, a circumferential portion of the position direction area 15 of the substrate 13 can be reduced in size.

SUMMARY OF THE INVENTION

However, in the sensor 100B of the example shown in FIG. 10, although the size of the substrate 13 can be reduced, the extraction line portions of the loop coils of the loop coil group 11 in the X-axis direction, and the loop coil group 12 in the Y-axis direction require the pairs of going lines and returning lines, respectively, and thus the number of conductor lines of the extension line portions need to be made twice as large as the number of loop coils. For this reason, when the sensor 100B and the external circuit portion are connected to each other through the connector portion 14, there is caused a problem that the number of connection pins in the connector portion 14 also becomes twice as large as the number of loop coils, which results in that the size of the connector portion becomes large.

When thin pattern wirings are used as the extension line portions, it is possible to miniaturize the size of the connector portion. However, when such thin pattern wirings are used as the extension line portions, there is caused another problem that the cost is increased.

On the other hand, as a method of reducing the number of lines in the extraction line portions connected to the connector portion, thereby reducing the number of connection pins of the connector portion, there is known a method of commonly connecting the returning lines of the extraction line portions to one point in the outside of the position detection area. In this case, however, when there is adopted the method of commonly connecting the returning lines of the extraction line portions to the common connection point as one point, the common connection point described above needs to be formed to have a solid pattern having a predetermined area so as not to detect any unnecessary magnetic fluxes.

That is to say, when this method is applied to the sensor 100B described above, although an illustration is omitted here, the solid pattern having the predetermined area is provided outside the position detection area 15 of the substrate 13, and the returning lines of the extraction line portions which are derived to the outside of the position detection area 15 are commonly connected to the solid pattern.

However, when such a solid pattern is provided, the size of the substrate 13 needs to be increased by the area (dimension) of the solid pattern. In addition, there is the possibility that during the transmission and reception of the electromagnetically induced signal to and from the position indicator, the magnetic flux is attenuated due to an eddy current loss in this solid pattern, especially, the position detection in a portion within the position detection area 15 close to the solid pattern becomes unstable.

The present invention has been made in order to solve the problems described above, and according to one aspect of the present invention, a sensor of an electromagnetic induction type coordinate input device is provided in which an area occupied by an extraction line portion is made minimum as much as possible, thereby making it possible to exclude a wasteful area occupied in a substrate, and the number of connection pins to the outside can be made smaller than a multiple number of the number of loop coils.

In order to attain the advantage described above, according to the present invention, there is provided a sensor of an electromagnetic induction type coordinate input device including:

a first loop coil group in which plural first loop coils each including a first extraction line portion composed of a first line and a second line formed in parallel with each other, and a first loop portion continuously connected to the first and second lines of the first extraction line portion and having such a shape as to surround an area having a predetermined dimension are disposed in a first direction; and a second loop coil group in which plural second loop coils each including a second extraction line portion composed of a third line and a fourth line formed in parallel with each other, and a second loop portion continuously connected to the third and fourth lines of the second extraction line portion and having such a shape as to surround an area having a predetermined dimension are disposed in a second direction perpendicular to the first direction, an area occupied by the first loop portion of the first loop coil group and the second loop portion of the second loop coil group, to thereby define a position detection area, wherein one of the first or second line of the first loop coil is connected to at least one of either the first or second line of another one of the first loop coils, or the line of the second loop portion of the second loop coil, within the position detection area, to be made into a common line, and the other of the first or second line of the first loop coil having the common line is disposed in parallel with and close to the common line.

In the sensor of an electromagnetic induction type coordinate input device according to the present invention, one of the first or second line of the first extraction line portion of the first loop coil is connected to at least one of either the first or second line of another one of the first loop coils, or the line of the second loop portion of the second loop coil, within the position detection area, to be made into a common line.

Therefore, the number of extraction lines becomes smaller, than twofold of the number of loop coils, by the number of common line(s). Also, since the connection of the line(s) to form common line(s) is carried out within the position detection area, the wasteful area such as the solid pattern needs not to be formed outside the position detection area of the substrate. For this reason, the size of the substrate can be made minimum.

In addition, since the other one of the first or second line of the loop coil having the common line is disposed in parallel with and close to the first or second line made into the common line, even though the lines are connected within the position detection area to be common, the dimension of the portion with which the magnetic flux due to the electromagnetic coupling to the position indicator interlinks can be made very small. For this reason, even when there is the possibility that the magnetic flux due to the electromagnetic coupling between the position indicator and the sensor interlinks with this portion to thereby cause an error in the position detection, the error can be suppressed to a very small value.

In addition, since it is unnecessary to dispose the solid pattern for making the lines in common in the vicinity of the position detection area of the substrate, the magnetic flux is prevented from being attenuated in the electromagnetic coupling between the position indicator and the sensor in the vicinity of the solid pattern described above.

As set forth hereinabove, the wasteful area occupied in the substrate can be excluded by making the area occupied by the extraction line portions minimum. Also, the number of connection pins to the outside can be made smaller than twofold of the number of loop coils.

DETAILED DESCRIPTION OF THE PREFERRED EMBODIMENTS

A description of sensors of an electromagnetic induction type coordinate input device, according to embodiments of the present invention, will be described in detail hereinafter with reference to the accompanying drawings.
[Description of Electronic Induction Type Coordinate Input Device]

Firstly, prior to giving a description of sensors according to first and second embodiments of the present invention, an example of a configuration of an electromagnetic induction type coordinate input device using any of the sensors according to the first and second embodiments of the present invention will now be described with reference to FIG. 2. It is noted that a pen type position indicator 300 used together with an electromagnetic type coordinate input device 200 of this example, as shown in FIG. 2, includes therein a resonance circuit composed of a coil 301 and a capacitor 302 connected in parallel with the coil 301.

Figure 2:
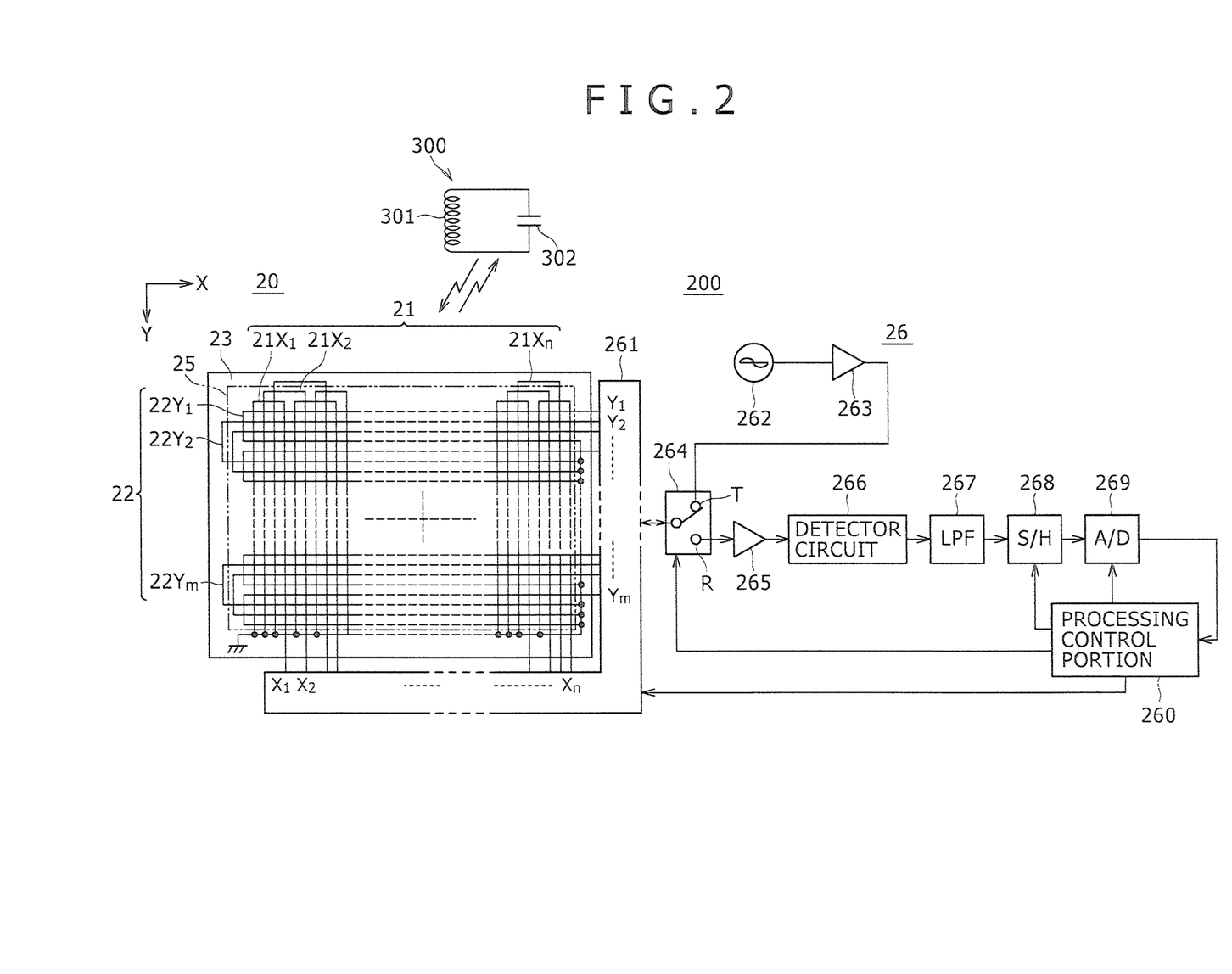
FIG. 2 is a block view showing a position detecting circuit of the electromagnetic induction type coordinate input device to which the present invention is applied.

In the sensor 20 of the coordinate input device 200 of this example, as shown in FIG. 2, a loop coil group 21 in an X-axis direction, and a loop coil group 22 in a Y-axis direction are disposed on a front surface and a back surface of a substrate 23, respectively, so as to spatially overlap each other. It is noted that in the example which will be described below, a transverse (horizontal) direction of the substrate 23 of the sensor 20 is defined as the X-axis direction, and a longitudinal (vertical) direction of the substrate 23 of the sensor 20 is defined as the Y-axis direction.

In this case, as shown in FIG. 2, the loop coil group 21 in the X-axis direction is composed of n (n: an integer number of 2 or more) rectangular loop coils $21X_1$ to $21X_n$ which are disposed in the X-axis direction. In addition, the loop coil group 22 in the Y-axis direction is composed of m (m: an integer number of 2 or more) rectangular loop coils $22Y_1$ to $22Y_m$ which are disposed in the Y-axis direction. In the sensor 20, a position detection area 25 is composed of a loop portion of the loop coil group 21 in the X-axis direction, and a loop portion of the loop coil group 22 in the Y-axis direction.

The sensor 20 is connected to a position detecting circuit 26 through a connector portion (not shown). The position detecting circuit 26 includes a selection circuit 261, an oscillator 262, a current driver 263, a transmission/reception switching circuit 264, a reception amplifier 265, a detector circuit 266, a low-pass filter 267, a sample-and-hold circuit 268, an Analog to Digital (A/D) conversion circuit 269, and a processing control portion 260.

Both of the X-axis direction loop coil group 21 and the Y-axis direction loop coil group 22 are connected to the selection circuit 261. The selection circuit 261 successively selects one loop coil from the X-axis direction loop coil group 21 and the Y-axis direction loop coil group 22 in accordance with a control instruction issued from the processing control portion 260.

The oscillator 262 generates an alternating current (A.C.) signal having a frequency of f0. After the A.C. signal is supplied to the current driver 263 to be converted into an A.C. current, the resulting A.C. current is sent to the transmission/reception switching circuit 264. The transmission/reception switching circuit 264 switches a connection destination (a transmission side terminal T or a reception side terminal R) to which the loop coil selected by the selection circuit 261 is connected every predetermined time in accordance with the control made by the processing control portion 260. The current driver 263 and the reception amplifier 265 are connected to the transmission side terminal T and the reception side terminal R, respectively.

Therefore, in a period of the transmission, the A.C. signal is supplied from the current driver 263 to the loop coil selected by the selection circuit 261 through the transmission side terminal T of the transmission/reception switching circuit 264. On the other hand, in a period of the reception, an induced voltage generated in the loop coil selected by the selection circuit 261 is supplied to the reception amplifier 265 through both of the selection circuit 261 and the reception side terminal R of the transmission/reception switching circuit 264, and is then amplified by the reception amplifier 265, thereby being sent to the detector circuit 266.

The amplified signal which has been detected by the detector circuit 266 is supplied to the A/D conversion circuit 269 through both of the low-pass filter 267 and the sample-and-hold circuit 268. In the A/D conversion circuit 269, the analog signal is converted into a digital signal which is in turn supplied to the processing control portion 260.

The processing control portion 260 carries out the control for the position detection. That is to say, the processing control portion 260 controls the selection of the two loop coils in the selection circuit 261, the signal switching in the transmission/reception switching circuit 264, the timing in the sample-and-hold circuit 268, and the like.

The processing control portion 260 carries out the switching operation in such a way that the transmission/reception switching circuit 264 is connected to the transmission side terminal T, and thus conduction-controls the loop coil selected from the X-axis direction loop coil group 21 or the Y-axis direction loop coil group 22 by the selection circuit 261, thereby sending the electromagnetic wave to the position indicator 300. The resonance circuit of the position indicator 300 receives the electromagnetic wave sent thereto, thereby accumulating energy therein.

Next, the processing control portion 260 carries out the switching operation in such a way that the transmission/reception switching circuit 264 is connected to the reception side terminal R. Then, the induced voltages are generated in the loop coils of the X-axis direction loop coil group 21 and the Y-axis direction loop coil group 22 due to the electromagnetic wave transmitted from the position indicator 300. The processing control portion 260 calculates coordinate values of the indicated position in the X-axis direction and in the Y-axis direction in the position detection area 25 of the sensor 20 based on the levels of the voltage values of the induced voltages generated in the loop coils. Also, the processing control portion 260 supplies information on the coordinate values thus calculated, for example, to an external personal computer or the like.

[Sensor According to First Embodiment of the Present Invention]

Figures 1A, 1B:
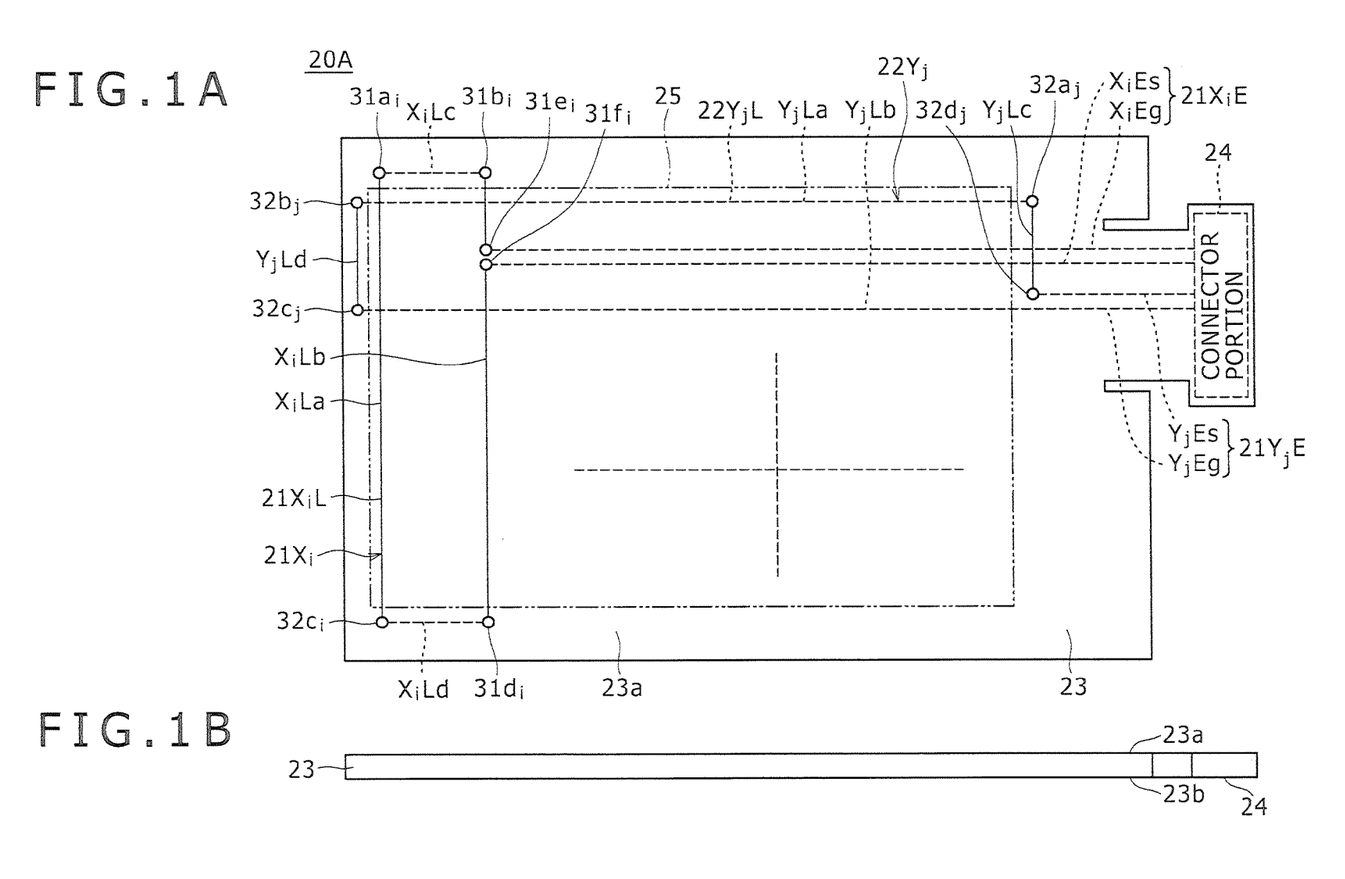
FIGS. 1A and 1B are respectively a top plan view and a side elevational view of a line pattern of X-axis direction loop coils and Y-axis direction loop coils in a sensor of an electromagnetic induction type coordinate input device, according to an embodiment of the present invention.

FIGS. 1A and 1B are respectively a top plan view and a side elevational view explaining how any loop coil $21X_i$ (i is any one of 1, 2, ..., n) of the loop coil group 21 in the X-axis direction, and any loop coil $22Y_j$ (j is any one of 1, 2, ..., m) of the loop coil group 22 in the Y-axis direction are formed on the substrate 23 in a sensor 20A according to a first embodiment of the present invention which is applied to the sensor 20 of the electromagnetic induction type coordinate input device shown in FIG. 2.

FIG. 1A is a top plan view when the substrate 23 is viewed from one side of the substrate 23, which is a surface 23a, and FIG. 1B is a side elevational view when the substrate 23 is viewed perpendicular to a thickness direction thereof. In FIG. 1B, an illustration of a conductor pattern composing the loop coil $21X_i$ and the loop coil $22Y_j$ is omitted for the sake of simplicity.

As shown in FIGS. 1A and 1B, the substrate 23 in this case is composed of a thin sheet-like flexible substrate. In addition, straight line portions $X_iLa$ and $X_iLb$ parallel with the Y-axis direction of a loop portion $21X_iL$ having such a shape as to surround a rectangular area in an X-axis direction loop coil $21X_i$ are formed on the one side surface 23a of the substrate 23. Also, straight line portions $X_iLc$ and $X_iLd$, which are parallel with the X-axis direction through which the straight line portions $X_iLa$ and $X_iLb$ described above are connected to each other, of the loop portion $21X_iL$ are formed on the other side of the substrate 23, which is a surface 23b. The straight line portions $X_iLa$ and $X_iLb$ on the one side surface 23a of the substrate 23, and the straight line portions $X_iLc$ and $X_iLd$ on the other side surface 23b of the substrate 23 are connected to each other via through holes $31a_i$, $31b_i$, $31c_i$ and $31d_i$.

Also, one of the straight line portions $X_iLa$ and $X_iLb$ of the loop portion $21X_iL$ which are provided on the one side surface 23a of the substrate 23, for example the straight line portion $X_iLb$ in the case shown in FIG. 1A, is cut in an intermediate portion thereof to be connected to a parallel pair of a first line and a second line of an extraction line portion $21X_iE$.

One of the first and second lines composing the extraction line portion $21X_iE$ is connected to the selection circuit 261 of the position detecting circuit 26 described above through a connector portion 24, thereby becoming a line through which a signal is supplied or a signal is taken out. Hereinafter, one line of the first and second lines composing the extraction line portion $21X_iE$ will be referred to as a going line $X_iEs$. On the other hand, the other of the first and second lines composing the extraction line portion $21X_iE$ is a line which is connected to a reference electric potential, for example, a grounding electric potential. Hereinafter, the other of the first and second lines composing the extraction line portion $21X_iE$ will be referred to as a returning line $X_iEg$. Note that, likewise, a Y-axis direction loop coil $22Y_j$ which will be described later also includes an extraction line portion $22Y_jE$ including a third line and a fourth line parallel with each other. Also, one of the third and fourth lines through which a signal is supplied or a signal is taken out will be referred to as a going line $Y_jEs$. On the other hand, the other of the third and fourth lines which is connected to a reference electric potential, for example, the grounding electric potential will be referred to as a returning line $Y_jEg$.

One of end portions of a cut portion of the straight line portion $X_iLb$ of the loop portion $21X_iL$ of the X-axis direction loop coil $21X_i$ is connected to the going line $X_iEs$ of the extraction line portion $21X_iE$ which is formed on the side of the other surface 23b of the substrate 23 through a through hole $31e_i$. The other of the end portions of the cut portion of the straight line portion $X_iLb$ is connected to the returning line $X_iEg$ of the extraction line portion $21X_iE$ which is formed on the side of the other surface 23b of the substrate 23 through a through hole $31f_i$. The going line $X_iEs$ and the returning line $X_iEg$, in this case, are disposed as the straight lines in the X-axis direction in parallel with and close to each other.

As shown in FIG. 1, the extraction line portion $21X_iE$ of the X-axis direction loop coil $21X_i$, in this case, exists within the position detection area 25. At least the going line $X_iEs$ and the returning line $X_iEg$ of the extraction line portion $21X_iE$ within the position detection area 25 are disposed as the straight lines in the X-axis direction, and are parallel with and close to each other. A distance between the going line $X_iEs$ and the returning line $X_iEg$, for example, is set to 0.1 mm.

The reason why the going line $X_iEs$ and the returning line $X_iEg$ of the extraction line portion $21X_iE$ are disposed as a pair of straight lines parallel with and close to each other in such a manner is as follows. Because the extraction line portion $21X_iE$ exists within the position area 25, an excess current is generated when the magnetic flux passes through an elongated surface defined by the pair of straight lines to thereby cause an error signal during the position detection using the position detecting circuit 26. The error signal can be suppressed by disposing the pair of straight lines in parallel with and close to each other.

Also, in this case, both of the going line $X_iEs$ and the returning line $X_iEg$ of the extraction line portion $21X_iE$ are connected to the connector portion 24 which is provided outside the position detection area 25.

In addition, with regard to the Y-axis direction loop coil $22Y_j$, straight line portions $Y_jLa$ and $Y_jLb$ parallel with the X-axis direction of the loop portion $22Y_jL$ having such a shape as to surround a rectangular area of the Y-axis direction loop coil $22Y_j$ are formed on the other side surface 23b of the substrate 23. On the other hand, straight line portions $Y_jLc$ and $Y_jLd$ parallel with the Y-axis direction through which the straight line portions $Y_jLa$ and $Y_jLb$ are connected to each other of the loop portion $22Y_jL$ are formed on the one side surface 23a of the substrate 23. The straight line portions $Y_jLa$ and $Y_jLb$ on the other side surface 23b of the substrate 23, and the straight line portions $Y_jLc$ and $Y_jLd$ on the one side surface 23a of the substrate 23 are connected to each other via through holes $32a_j$, $32b_j$, and $32c_j$.

One of the straight line portions $Y_jLa$ and $Y_jLb$ of the loop portion $22Y_jL$ of the Y-axis direction loop coil $22Y_j$ which is provided on the other side surface 23b of the substrate 23, for example the straight line portion $Y_jLb$ in this case extends in the X-axis direction beyond the position detection area 25, thereby becoming the returning line $Y_jEg$ of the extraction line portion $22Y_jE$. In addition, the straight line portion $Y_jLc$ of the loop portion $22Y_jL$ located in a position closest to the connector side in the X-axis direction in the position detection area 25 is connected to the going line $Y_jEs$ of the extraction line portion $22Y_jE$ which is formed in the X-axis direction on the other side surface 23b of the substrate 23 through the through hole $32d_j$. The going line $Y_jEs$ is disposed in parallel with and close to the returning line $Y_jEg$.

The going line $Y_jEs$ of the extraction line portion $22Y_jE$ is connected to the selection circuit 261 of the position detecting circuit 26 described above, thereby becoming a line through which a signal is supplied or a signal is taken out. The returning line $Y_jEg$ is a line which is connected to the reference electric potential, for example, the grounding electric potential. Both of the going line $Y_jEs$ and the returning line $Y_jEg$ of the extraction line portion $22Y_jE$ of the Y-axis direction loop coil $22Y_j$ are also connected to the connector portion 24.

Note that, it goes without saying that each of the loop portion $21X_iL$ of the X-axis direction loop coil $21X_i$ and the loop portion $22Y_jL$ of the Y-axis direction loop coil $21Y_j$ is disposed so as to surround an area of predetermined dimension that is sufficient to interlink with the position indicator 300 via the magnetic flux due to the electromagnetic induction.

[Main Portion of Sensor 20A According to First Embodiment]

In the sensor 20A according to the first embodiment, the returning line $X_iEg$ of the extraction line portion $21X_iE$ of the X-axis direction loop coil $21X_i$ which is formed on the substrate 23 is made common with a returning line $X_kEg$ (i≠k) of an extraction line portion $21X_kE$ of any X-axis direction loop coil $21X_k$ in the manner described above, thereby reducing the total number of extraction lines through which the X-axis direction loop coil group 21 is connected to the connector portion 24 which is provided outside the position detection area 25. That is, a single returning line XiEg can be provided in common for two or more of the X-axis direction loop coils.

Figure 3:
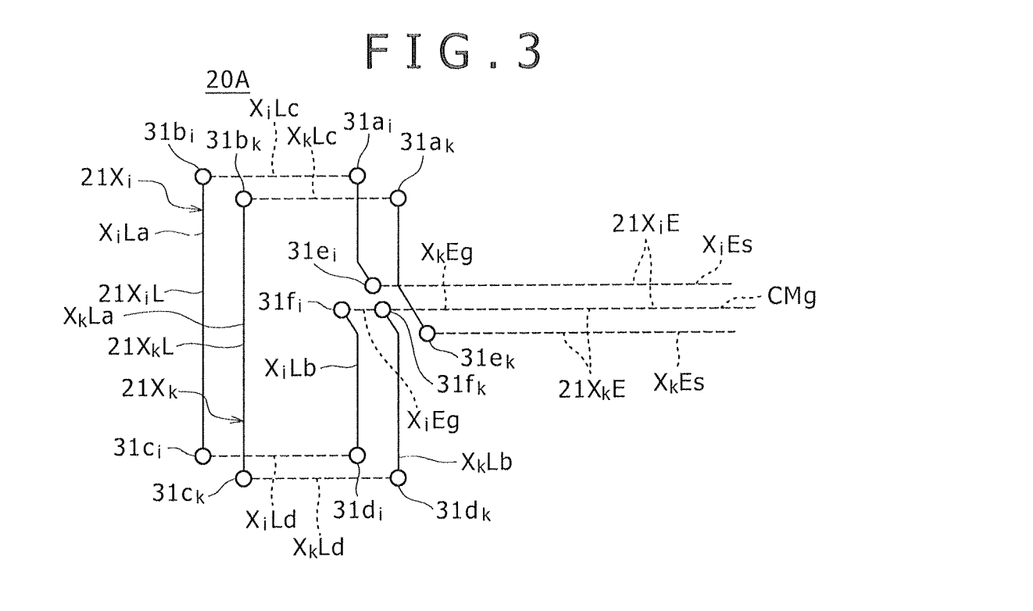
FIG. 3 is a diagram showing a configuration of a main portion of a sensor of the electromagnetic induction type coordinate input device, according to a first embodiment of the present invention.

FIG. 3 is a circuit diagram explaining the process of making common (consolidating) the returning lines of arbitrary two X-axis direction loop coils of the X-axis direction loop coil group 21 which is formed on the substrate 23 in the sensor 20A according to the first embodiment. Specifically, FIG. 3 shows the case where the returning line is made common between the extraction line $21X_iE$ of the X-axis direction loop coil $21X_i$, and the extraction line $21X_kE$ of the X-axis direction loop coil $21X_k$. In FIG. 3, similarly to the case of FIG. 1, a straight line indicated by a solid line shows the line formed on the one side surface 23a of the substrate 23, and a straight line indicated by a dotted line shows the line formed on the other side surface 23b of the substrate 23.

The straight line portions $X_iLa$ and $X_iLb$ of the loop portion $21X_iL$ of the X-axis direction loop coil $21X_i$ formed on the one side surface 23a of the substrate 23 are connected to the straight line portions $X_iLc$ and $X_iLd$ formed on the other side surface 23b of the substrate 23 through the through holes $31a_i$, $31b_i$, $31c_i$, and $31d_i$ in the manner as described above. Likewise, straight line portions $X_kLa$ and $X_kLb$ of a loop portion $21X_kL$ of an X-axis direction loop coil $21X_k$ formed on the one side surface 23a of the substrate 23 are connected to straight line portions $X_kLc$ and $X_kLd$ formed on the other surface 23b of the substrate 23 via through holes $31a_k$, $31b_k$, $31c_k$, and $31d_k$.

One end portion of a cut portion of the straight line portion $X_iLb$ of the loop portion $21X_iL$ of the X-axis direction loop coil $21X_i$ which is formed on the one side surface 23a of the substrate 23, and one end portion of a cut portion of the straight line portion $X_kLb$ of the loop portion $21X_kL$ of the X-axis direction loop coil $21X_k$ which is formed on the one side surface 23a of the substrate 23 are connected to the going lines $X_iEs$ and $X_kEs$ of the extraction lines $21X_iE$ and $21X_kE$ through the through holes $31e_i$ and $31e_k$, respectively.

In addition, the other end portions of the cut portions of the straight line portions $X_iLb$ and $X_kLb$ are connected to the returning lines $X_iEg$ and $X_kEg$ of the extraction lines $21X_iE$ and $21X_kE$ via through holes $31f_i$ and $31f_k$, respectively. In this case, the returning line $X_iEg$ of the extraction line portion $21X_iE$ of the X-axis direction loop coil $21X_i$, exclusive of a portion between the through holes $31f_i$ and $31f_k$, is commonly used by a returning line $X_kEg$ of the X-axis direction loop coil $21X_k$. That is to say, the returning line $X_iEg$ and the returning line $X_kEg$ are disposed as a common returning line CMg.

The going line $X_iEs$ of the extraction line portion $21X_iE$ of the X-axis direction loop coil $21X_i$ is disposed in parallel with and close to the common returning line CMg. A going line $X_kEs$ of the extraction line portion $21X_kE$ of the X-axis direction loop coil $21X_k$ is also disposed in parallel with and close to the common returning line CMg.

In the related art, the two extraction lines are required in terms of the extraction line portion $21X_iE$ of the X-axis direction loop coil $21X_i$, and the two extraction lines are required in terms of the extraction line portion $21X_kE$ of the X-axis direction loop coil $21X_k$, that is, total four extraction lines are required for the two loop coils. On the other hand, in the sensor 20A according to the first embodiment of the present invention, the returning line of the loop coil in the X-axis direction is made common with the returning lines of other loop coils in the X-axis direction, whereby the number of extraction lines can be reduced to three which is one smaller than the four extraction lines required in the related art.

In the sensor 20A according to the first embodiment of the present invention, the going line $X_iEs$ of the extraction line portion $21X_iE$ of the X-axis direction loop coil $21X_i$, and the going line $X_kEs$ of the extraction line portion $21X_kE$ of the X-axis direction loop coil $21X_k$ are formed on both sides of the common returning CMg at the center. For this reason, the through holes $31e_i$ and $31e_k$ are formed in the positions that sandwich the common returning CMg therebetween.

The going line $X_iEs$ and the going line $X_kEs$ are disposed on both sides with the common returning CMg at the center, whereby a distance between the going line $X_iEs$ and the common returning line CMg, and a distance between the going line $X_kEs$ and the common returning line CMg can be equalized and each of the two distances, for example, can be set to 0.1 mm. As a result, an area defined between the going line and the returning line can be held minimum and thus, generation of an error signal can be minimized.

In the manner as described above, each two returning lines of the extraction lines $21X_1$ to $21X_n$ can be made common for each two of n loop coils $21X_1$ to $21X_n$ of the X-axis direction loop coil group 21, whereby the number of returning lines of the entire extraction lines derived from the X-axis direction loop coil group 21 can be made one half of that required in the related art.

Furthermore, three or more X-axis direction loop coils can have their returning lines in common with each other, whereby the number of returning lines of the entire extraction lines derived from the X-axis direction loop coil group 21 can be made even smaller.

Figure 4:
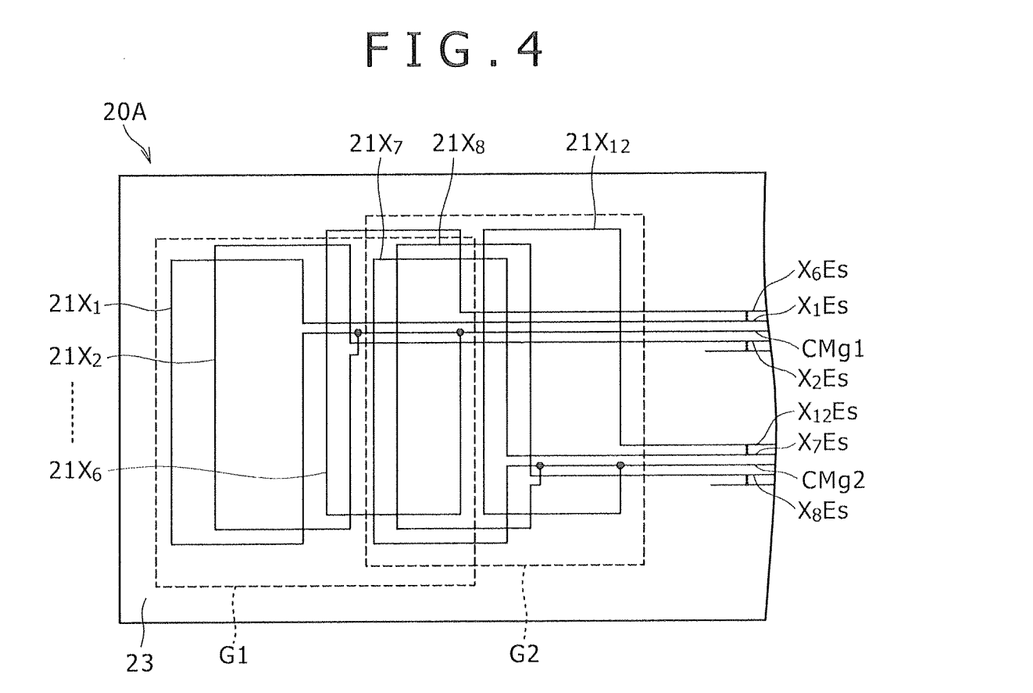
FIG. 4 is a diagram showing a configuration of the sensor of the electromagnetic induction type coordinate input device, according to the first embodiment of the present invention.

For example, as shown in FIG. 4, the n X-axis direction loop coils $21X_1$ to $21X_n$ of the X-axis direction loop coil group 21 are divided into plural groups G1, G2, . . . each having two or more X-axis direction loop coils, and the returning lines can be made common in each group, whereby the number of returning lines of the entire extraction lines derived from the X-axis direction loop coil group 21 can be made equal to the number of groups. That is to say, as shown in FIG. 4, the X-axis direction loop coil group 21 can be configured so as to include one common returning line CMg1, CMg2, . . . in every group G1, G2, . . . , respectively. Note that, it goes without saying that the number of X-axis direction loop coils composing the groups G1, G2, . . . need not be equal to one another, but may be different amongst the groups.

Figure 5:
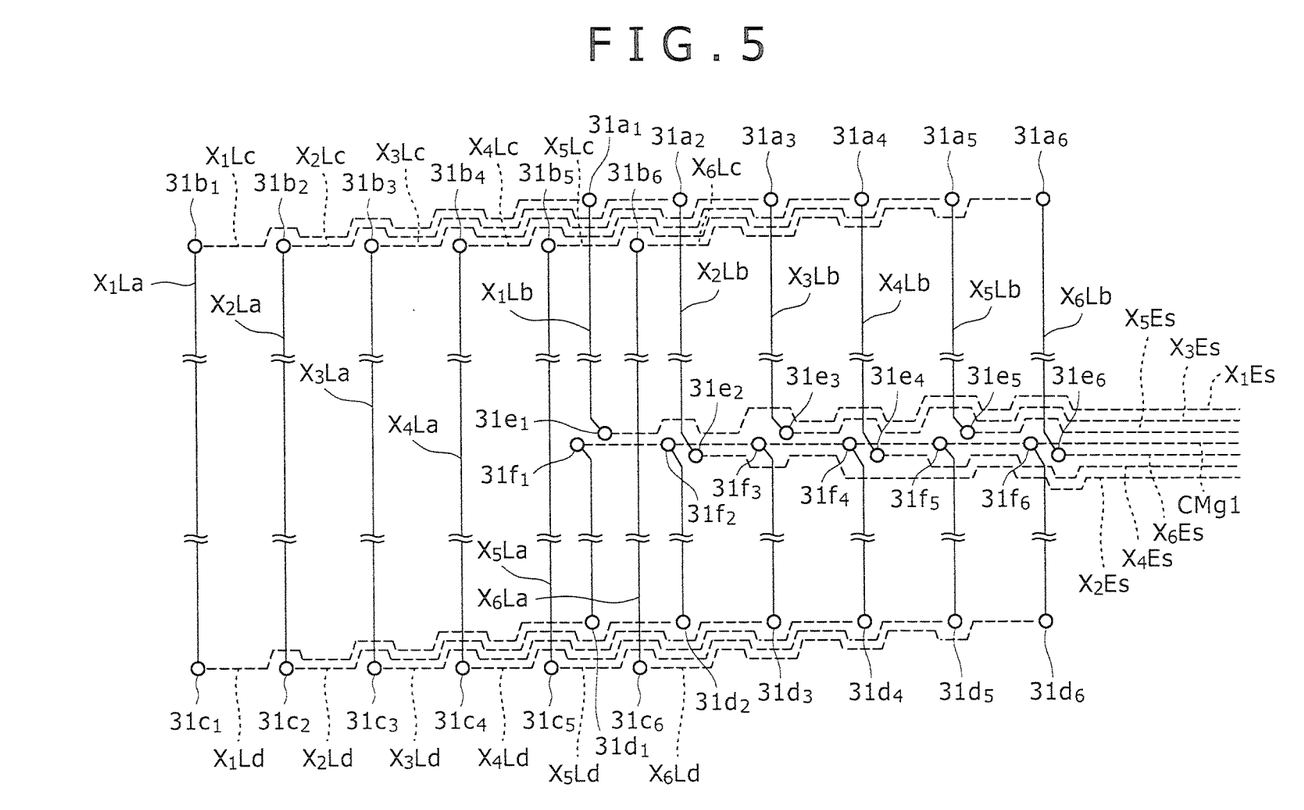
FIG. 5 is a circuit diagram showing a configuration of a part of the sensor, shown in FIG. 4.

FIG. 5 shows an example of a line pattern of plural X-axis direction loop coils in one group when the line pattern is formed on the substrate 23. Specifically, FIG. 5 shows an example where the group G1 is composed of six X-axis direction loop coils $21X_1$ to $21X_6$. A line pattern of plural X-axis direction loop coils in any of other groups has the same configuration as that shown in FIG. 5.

That is to say, FIG. 5 shows the line pattern and the through holes when viewed from the one side surface 23a of the substrate 23 only with respect to the group G1. In FIG. 5, the line pattern on the one side surface 23a of the substrate 23 is indicated by a solid line, and the line pattern on the other side surface 23b of the substrate 23 is indicated by a dotted line.

Four straight line portions of each of the loop coils $21X_1$ to $21X_6$, i.e., $X_1La$, $X_1Lb$, $X_1Lc$, and $X_1Ld$ to $X_6La$, $X_6Lb$, $X_6Lc$, and $X_6Ld$, as described with reference to FIG. 3 above, are connected via through holes $31a_1$, $31b_1$, $31c_1$, and $31d_1$ to $31a_6$, $31b_6$, $31c_6$, and $31d_6$.

One end portions of cut portions of the straight line portions $X_1Lb$ to $X_6Lb$, which are formed on the one side surface 23a of the substrate 23, are connected to going lines $X_1Es$ to $X_6Es$ via through holes $31e_1$ to $31e_6$, respectively.

The other ends of the cut portions of the straight line portions $X_1Lb$ to $X_6Lb$ are connected to the returning line patterns on the other side surface 23b of the substrate 23 through the through holes $31f_1$ to $31f_6$, respectively. In this case, since the through holes $31f_1$ to $31f_6$ are all connected to the common returning line CMg1 as one line portion on the other side surface 23b of the substrate 23, the other ends of the cut portions of the straight line portions $X_1Lb$ to $X_6Lb$ are all connected to the common returning line CMg1. That is to say, the returning lines of the extraction line portions $21X_1E$ to $21X_6E$ of the six X-axis direction loop coils $21X_1$ to $21X_6$ are collectively disposed as one common returning line CMg1.

As a result, although in the related art, six pairs of going lines and returning lines, that is, total 12 lines are required in terms of lines of the extraction line portions of the six X-axis direction loop coils $21X_1$ to $21X_6$, in the case shown in FIG. 5, the six going lines and the one common returning line, that is, only seven lines in total are required and thus, the number of lines can be greatly reduced.

The going lines $X_1Es$ to $X_6Es$ of the extraction line portions $21X_1E$ to $21X_6E$ of the X-axis direction loop coils $21X_1$ to $21X_6$ are all disposed in parallel with and close to the common returning line CMg1. In this case as well, a distance between each adjacent two lines in the going lines $X_1Es$ to $X_6Es$ is set to 0.1 mm.

In this case, the six going lines $X_1Es$ to $X_6Es$, as shown in FIG. 5, are disposed on both sides of the common returning line CMg1 as the center. The six going lines $X_1Es$ to $X_6Es$ are alternately disposed on both sides of the common returning line CMg1 in the order of the loop portions located in the faraway positions when viewed from the connector portion 24 side. As a result, of the six going lines $X_1Es$ to $X_6Es$, the three going lines $X_1Es$, $X_3Es$, and $X_5Es$ are disposed on the upper side of the common returning line CMg1 in the figure, and the remaining three going lines $X_2Es$, $X_4Es$, and $X_6Es$ are disposed on the lower side of the common returning line CMg1 in the figure. In this case, in order that the six going lines $X_1Es$ to $X_6Es$ are prevented from overlapping one another, the going lines closer to the connector portion 24 (i.e., $X_6Es$, $X_5Es$, and so forth) are located in the inner position closer to the common returning line CMg1.

Plural going lines are disposed on both sides of the common returning line CMg1 in this a manner, whereby the maximum value of the distance between the going line and the common returning line can be made a half as compared with the case where, for example, plural going lines are all disposed only on one side of the common returning line CMg1. Therefore, the area defined by the distance between the going line and the common returning line can be reduced as much as possible and thus generation of an error signal can be suppressed. In addition, the going lines are alternately disposed on both sides of the common returning line, depending on the distances of the loop portions of the X-axis direction loop coils from the connector portion side, whereby variation due to the error signals in the extraction line portions can be made uniform.

As has been described, according to the first embodiment, the returning line of a X-axis direction loop coil is made common with the returning line(s) of other X-axis direction loop coil(s), whereby the number of lines of the extraction lines can be reduced as compared with the case of the related art. In addition, since the solid pattern as used in the related art is not provided at all, it is possible to avoid attenuation of the magnetic flux in the electromagnetic coupling between the position indicator and the sensor 20A in the vicinity of the solid pattern.

In addition, when the sensor 20A of an electromagnetic induction type coordinate input device and the position detecting circuit 29 are connected to each other in the connector portion 24, the number of connector pins is reduced, which results in that the connector portion 24 can be miniaturized and cost can be reduced.

It is noted that, of course, a configuration may also be adopted such that the returning lines $X_1Eg$ to $X_nEg$ of the extraction line portions $21X_1E$ to $21X_nE$ of the X-axis direction loop coils $21X_1$ to $21X_n$ are all made common to be disposed in the form of one common returning line CMg. However, when the number of X-axis direction loop coils is large, the distance between the common returning line CMg and the outermost going line becomes large, which results in that it is necessary to take the influence of the error signal into consideration. Thus, as shown in FIGS. 4 and 5, it is better to divide the n X-axis direction loop coils $21X_1$ to $21X_n$ of the X-axis direction loop coil group 21 into plural groups.

It is noted that although in the first embodiment described above, only the X-axis direction loop coil group has been described, the first embodiment can completely, similarly apply to the Y-axis direction loop coil group. In this case, the minimum value of the number of returning lines of the extraction lines is two in total: one with respect to the X-axis direction loop coil group 21; and one with respect to the X-axis direction loop coil group 22.

It is noted that although in the first embodiment described above, both of the extraction line portions of the X-axis direction loop coil group and the Y-axis direction loop coil group are commonly connected to one connector portion, the line formation direction of the X-axis direction loop coil group and the Y-axis direction loop coil group may be different from each other so as to be set to the directions perpendicular to each other.

In addition, although in the first embodiment described above, the X-axis direction loop coil group 21 and the Y-axis direction loop coil group 22 are formed by using both of the surfaces: the first surface of one sheet of substrate 23; and the second surface on the side opposite to the first surface, there may also be adopted a structure in which the X-axis direction loop coil group 21 and the Y-axis direction loop coil group 21 are formed on different substrates, respectively, and the two sheets of substrates are stuck to each other, thereby forming a two-layer substrate.

[Sensor According to Second Embodiment of the Present Invention]

In a sensor 20B according to a second embodiment of the present invention also, the X-axis direction loop coil 21X$_i$ and the Y-axis direction loop coil 22Y$_j$ are individually formed on the substrate 23 in the manner as shown in FIG. 1.

Figure 6:
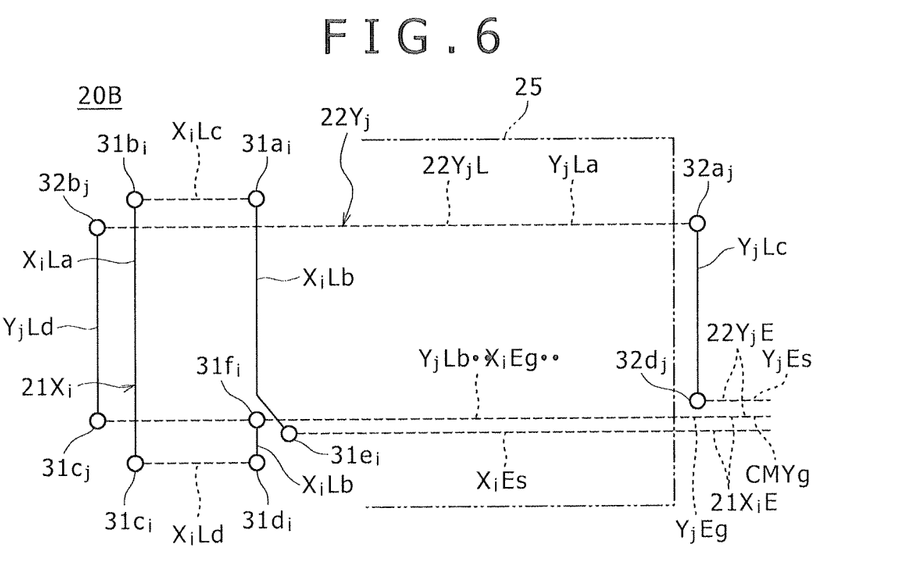
FIG. 6 is a diagram showing a configuration of a main portion of a sensor of the electromagnetic induction type coordinate input device, according to a second embodiment of the present invention.

However, in the sensor 20B according to the second embodiment of the present invention, as shown in FIG. 6, the returning line X$_i$Eg of the extraction line portion 21X$_i$E of the X-axis direction loop coil 21X$_i$ is connected to one straight line portion Y$_j$Lb of the loop portion 22Y$_j$L of the Y-axis direction loop coil 22Y$_j$, and the straight line portion Y$_j$Lb is used in common with and as the returning line X$_i$Eg. Thus, the total number of extraction lines is reduced through which the X-axis direction loop coil group 21 is connected to the connector portion 24, which is provided outside the position detecting area 25. It is noted that in FIG. 6 as well, similarly to the case of FIG. 1, the straight line indicated by the solid line shows the line formed on the one side surface 23a of the substrate 23, and the straight line indicated by the dotted line shows the line formed on the other side surface 23b of the substrate 23.

That is to say, as shown in FIG. 6, the straight line portions Y$_j$La and Y$_j$Lb in the X-axis direction on the other side surface 23b of the substrate 23, and the straight line portions Y$_j$Lc and Y$_j$Ld in the Y-axis direction on the one side surface 23a of the substrate 23 are connected through the through holes 32a$_j$, 32b$_j$, and 32c$_j$, thereby forming the loop portion 22Y$_j$L of the Y-axis direction loop coil 22Y$_j$.

As also described above, the straight line portion Y$_j$Lc on the one side surface 23a of the substrate 23 is connected to the going line Y$_j$Es which is formed in parallel with the X-axis direction and outside the position detection area 25 on the other side surface 23b of the substrate 23 through the through hole 32d$_j$. In addition, the straight line portion Y$_j$Lb in the X-axis direction which is formed on the side of the other side surface 23b of the substrate 23 is formed outside the position detection area 25 so as to further extend in the X-axis direction, thereby becoming the returning line Y$_j$Eg.

On the other hand, similarly to the case of FIG. 3, the straight line portions X$_i$La and X$_i$Lb on the one side surface 23a of the substrate 23, and the straight line portions X$_i$Lc and X$_i$Ld on the other side surface 23b of the substrate 23 are connected through the through holes 31a$_i$, 31b$_i$, and 31c$_i$, and 31d$_i$, thereby forming the loop portion 21X$_i$L of the X-axis direction loop coil 21X$_i$.

Also, one end portion of the cut portion of the straight line portion X$_i$Lb which is formed on the one side surface 23a of the substrate 23 is connected to the going line X$_i$Es of the extraction line 21X$_i$E which is formed on the other side surface 23b of the substrate 23 through the through hole 31e$_j$. The going line X$_i$Es is disposed in parallel with and close to the straight line portion Y$_j$Lb of the loop portion 22Y$_j$L of the Y-axis direction loop coil 22Y$_j$. The distance between the going line X$_i$Es and the straight line portion Y$_j$Lb of the loop portion 22V, for example, is set to 0.1 mm.

Also, in the second embodiment, the other end portion of the cut portion of the straight line portion X$_i$Lb is connected to an intermediate portion of the straight line portion Y$_j$Lb of the loop portion 22Y$_j$L of the Y-axis direction loop coil 22Y$_j$ through the through hole 31f$_i$. The straight line portion Y$_j$Lb of the loop portion 22Y$_j$L, as described above, is the line in which the returning line Y$_j$Eg of the extraction line portion 22Y$_j$E of the Y-axis direction loop coil 22Y$_j$ is disposed as an extension portion of the straight line portion Y$_j$Lb of the loop portion 22Y$_j$L.

As described above, the straight line portion Y$_j$Lb of the loop portion 22Y$_j$L of the Y-axis direction loop coil 22Y$_j$ is disposed in parallel with and close to the going line X$_i$Es of the extraction line portion 21X$_i$E of the X-axis direction loop coil 21X$_i$.

Therefore, in the straight line portion Y$_j$Lb of the loop portion 22Y$_j$L of the Y-axis direction loop coil 22Y$_j$, a portion from a connection point with the straight line portion X$_i$Lb of the X-axis direction loop coil 21X$_i$ through the through hole 31f$_i$ to the connector portion 24 is commonly used as the returning line X$_i$Eg of the extraction line portion 21X$_i$E of the X-axis direction loop coil 21X$_i$.

In the second embodiment, the sensor 20B is configured in such a way that the extraction line portion 21X$_i$E of the X-axis direction loop coil 21X$_i$ and the extraction line portion 22Y$_j$E of the Y-axis direction loop coil 22Y$_j$, through which the position detection area 25 is connected to the connector portion 24 (not shown in FIG. 6) provided outside the position detection area 25, have a common returning line CMYg.

As described above, in the second embodiment, in the extraction line portion 21X$_i$E from the X-axis direction loop coil 21X$_i$, the number of extraction lines can be reduced because it is unnecessary to separately provide the returning lines.

In the second embodiment, when the number of X-axis direction loop coils of the X-axis direction loop coil group 21 is equal to or smaller than the number of Y-axis direction loop coils of the Y-axis direction loop coil group 22, different X-axis direction loop coils can have their returning lines in common with different Y-axis direction loop coils, respectively. In this case, a distance between each pair of the extraction lines of the X-axis direction loop coils existing within the position detection area 25, i.e., the distance between the going line and the common returning line (i.e., the straight line portion of the loop portion of the Y-axis direction loop coil) can be set to the minimum distance, for example, 0.1 mm. Thus, generation of an error signal can be minimized.

Since the returning lines as the extraction lines of the X-axis direction loop coils of the X-axis direction loop coil group 21 can be made unnecessary, the number of returning lines of the extraction lines from the X-axis direction loop coil group 21 and the Y-axis direction loop coil group 22 as a whole can be reduced to only the number of Y-axis direction loop coils. Therefore, the number of returning lines of the extraction lines from the X-axis direction loop coil group 21 and the Y-axis direction loop coil group 22 as a whole can be further reduced as compared with the case in the first embodiment.

Note that, when the number of X-axis direction loop coil of the X-axis direction loop coil group 21 is larger than the number of Y-axis direction loop coils of the Y-axis direction loop coil group 22, plural X-axis direction loop coils may commonly share a part of the straight line portion of the loop portion of a Y-axis direction loop coil as the returning line. That is to say, the first embodiment and the second embodiment may be combined in this case.

Figure 7:
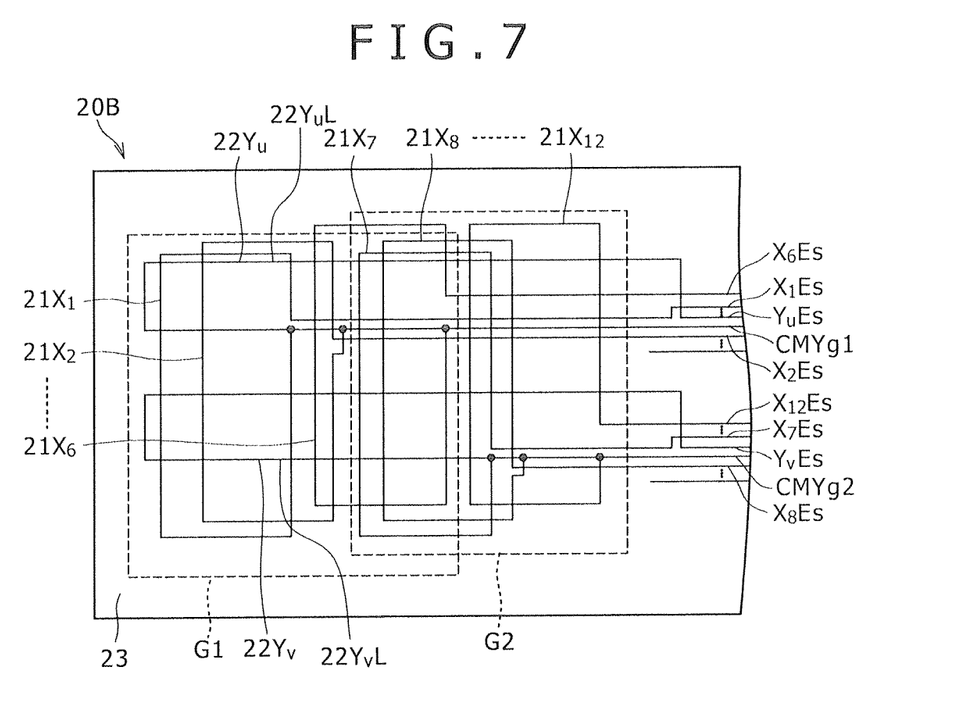
FIG. 7 is a diagram showing a configuration of the sensor of the electromagnetic induction type coordinate input device, according to the second embodiment of the present invention.

FIG. 7 shows the case where the second embodiment is applied to the case of FIG. 5 of the first embodiment. In the case shown in FIG. 7, the returning lines of the X-axis direction loop coils $21X_1$ to $21X_6$ of the group G1 are made common with a part of a loop portion $22Y_uL$ of a Y-direction loop coil $22Y_u$ to form a common returning line CMYg1, which leads to the outside of the position detection area 25. The returning lines of the X-axis direction loop coils $21X_7$ to $21X_{12}$ of the group G2 are made common with a part of a loop portion $22Y_vL$ of a Y-direction loop coil $22Y_v$ to form a common returning line CMYg2, which leads to the outside of the position detection area 25.

Figure 8:
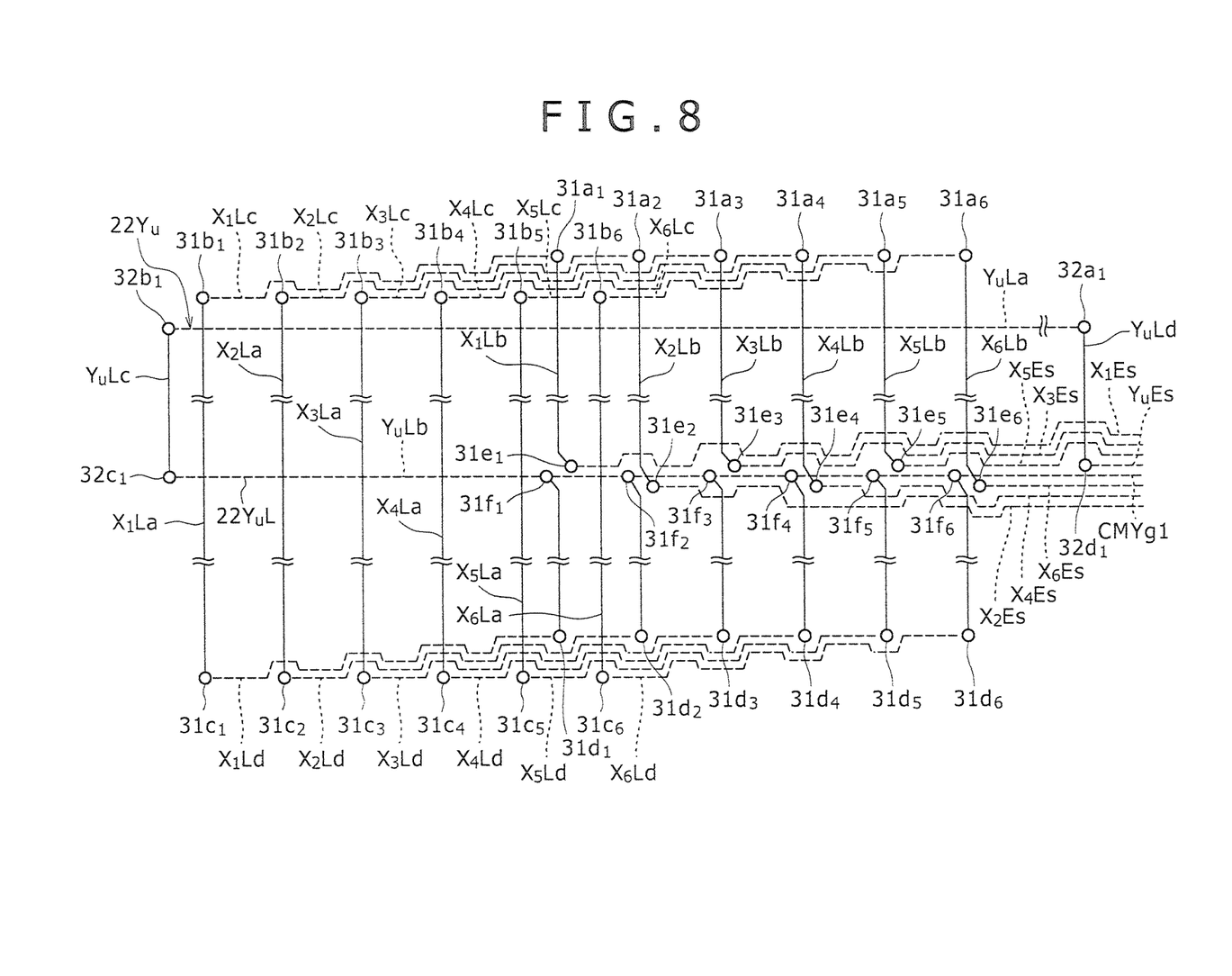
FIG. 8 is a circuit diagram showing a configuration of a part of the sensor, shown in FIG. 7.

FIG. 8 shows a line pattern of the substrate 23 in the group G1 in the case of the second embodiment shown in FIG. 7. It is noted that in FIGS. 7 and 8, the same portions as those in FIGS. 4 and 5 are designated by the same reference symbols, respectively.

As shown in FIG. 8, the returning lines of the X-axis direction loop coils $21X_1$ to $21X_6$ of group G1, $21X_7$ to $21X_{12}$ of group G2, . . . are made common in the manner as described in the above first embodiment. Also, in the second embodiment, in the group G1, a part of the straight line portion $Y_uLb$ of the loop portion $22Y_uL$ of the Y-axis direction loop coil $22Y_u$ is commonly used with the common returning line of the X-axis direction loop coils $21X_1$ to $21X_6$ of the group G1, and is disposed in the form of the common returning line CMYg1 outside of the position detection area 25. Similarly, in the group G2, a part of the straight line portion $Y_vLb$ of the loop portion $22Y_vL$ of the Y-axis direction loop coil $22Y_v$ is commonly used with the common returning line of the X-axis direction loop $21X_7$ to $21X_{12}$ of the group G2, and is disposed in the form of the common returning line CMYg2 outside of the position detection area 25.

The going line $Y_uEs$ of the extraction line portion $Y_uE$ of the Y-axis direction loop coil $22Y_u$, in this case, is formed in the form of a line which is parallel with and closest to the common returning line CMYg1. Likewise, the going line $Y_vEs$ of the extraction line portion $Y_vE$ of the Y-axis direction loop coil $22Y_v$, in this case, is formed in the form of a line which is parallel with and closest to the common returning line CMYg2.

In the second embodiment, the returning lines of all of the X-axis direction loop coils of the X-axis direction loop coil group 21 are connected to the lines of the loop portions of the Y-axis direction loop coils of the Y-axis direction loop coil group 21, which are the returning lines for the Y-axis direction loop coils or to which the returning lines for the Y-axis direction loop coils are connected (including the case where the lines are extended to be made the returning lines as with the case described above), whereby the lines of the loop portions of the Y-axis direction loop coils can be commonly used as the returning lines for the X-axis direction loop coils, also. For this reason, the number of returning lines of the extraction lines from the X-axis direction loop coil group 21 and the Y-axis direction loop coil group 22 as a whole can be the number of Y-axis direction loop coils $22Y_1$ to $22Y_m$, and thus can be made a half of that required in the related art.

Furthermore, when the first embodiment is additionally applied to the Y-axis direction loop coils $22Y_1$ to $22Y_m$, the number of returning lines of the extraction lines from the Y-axis direction loop coil group 22 can be further reduced to be as little as one as a minimum value. Therefore, the number of returning lines of the extraction line from the X-axis direction loop coil 21 and the Y-axis direction loop coil group 22 as a whole can be reduced to one as a minimum value, and thus it is possible to largely reduce the number of lines.

Therefore, although according to the second embodiment, the same effect as that of the first embodiment of the present invention is obtained, since the number of extraction lines can be even more greatly reduced than in the first embodiment, the second embodiment of the present invention may have a more significant effect.

Note that, in the second embodiment as well, it is unnecessary to divide the X-axis direction loop coils $21X_1$ to $21X_n$ of the X-axis direction loop coil group 21 into groups, with different groups sharing lines with different Y-axis loop coils, respectively, as shown in FIG. 8. Thus, the returning lines of all of the X-axis direction loop coils $21X_1$ to $21X_n$ of the X-axis direction loop group 21 may be connected to the loop portion of an arbitrary one Y-axis direction loop coil $22Y_j$ of the Y-axis direction loop coil group 22 to thereby form a single common line.

In addition, it is possible to adopt a configuration in which a relationship between the X-axis direction loop coil group and the Y-axis direction loop coil group in the second embodiment described above is reversed. In addition, although in the second embodiment described above, both of the extraction line portions from the X-axis direction loop coil group and the Y-axis direction loop coil group are formed in the direction parallel with the X-axis direction and thus are commonly connected to one connector portion, both of the extraction line portions from the X-axis direction loop coil group and the Y-axis direction loop coil group may be formed instead in the direction parallel with the Y-axis direction to be commonly connected to one connector portion.

In one aspect, only the going lines may be derived in the X-axis direction from the X-axis direction loop coils of the X-axis direction loop coil group, and the going lines and the returning lines or the common returning lines may be derived in the Y-axis direction from the Y-axis direction loop coils of the Y-axis direction loop coil group.

In addition, although in the second embodiment described above, the X-axis direction loop coil group 21 and the Y-axis direction loop coil group 22 are formed by using both surfaces: the first surface of one sheet of substrate 23; and the second surface on the side opposite to the first surface, another structure is also possible in which the X-axis direction loop coil group 21 and the Y-axis direction loop coil group 22 are formed on different substrates, respectively, and the two sheets of substrates are stuck to each other, thereby forming a two-layer substrate. In this case, each returning line of the X-axis direction loop coil and each corresponding line of the loop portion of the Y-axis direction loop coil are connected through a through hole.

[Modifications and Changes]

Although in the first and second embodiments of the present invention described above, each of the X-axis direction loop coils and the Y-axis direction loop coils as examples of the first and second loop coils has a rectangular shape surrounded by the loop portion, the shape of each of the loop portions of the loop coils of the first and second loop coils to which the present invention can be applied is by no means limited thereto. For example, each of the loop portions of the loop coils of the first and second loop coils to which the present invention can be applied may also have various kinds of shapes such as a round shape, an elliptical shape, a fan-like shape, and a triangular shape.

In addition, although in the first and second embodiments of the present invention described above, each of the loop portions of the X-axis direction loop coils and the Y-axis direction loop coils has one turn, each of the loop portions of the first and second loop coils to which the present invention can be applied may have multiple windings of two or more turns.

In addition, the sensor of an electromagnetic induction type coordinate input device according to the present invention can be used as a sensor which is superimposed and used on a viewing area of a display device as with a high-performance mobile phone unit called a smartphone. In addition, it goes without saying that the sensor of an electromagnetic induction type coordinate input device according to the present invention not only can be used as a sensor of a slate PC or a notebook-size personal computer including a display device which incorporates a coordinate input device, but also can be applied to a sensor of a coordinate input device which does not incorporate a screen.

The invention claimed is:

1. A sensor of an electromagnetic induction type coordinate input device, comprising:
    a first loop coil group, in which plural first loop coils are disposed in a first direction, each of the first loop coils including a first extraction line portion composed of a first line and a second line formed in parallel with each other, and a first loop portion continuously connected to the first and second lines of the first extraction line portion and having a shape that surrounds a predetermined area; and
    a second loop coil group, in which plural second loop coils are disposed in a second direction perpendicular to the first direction, each of the second loop coils including a second extraction line portion composed of a third line and a fourth line formed in parallel with each other, and a second loop portion continuously connected to the third and fourth lines of the second extraction line portion and having a shape that surrounds a predetermined area, wherein an area occupied by the first loop portions of the first loop coil group and the second loop portions of the second loop coil group define a position detection area, and
    wherein one of the first line or the second line of one of the first loop coils is connected to at least one of: (i) the first line or the second line of another one of the first loop coils, and (ii) a line of the second loop portion of one of the second loop coils, within the position detection area, to form a common extraction line with (i) and/or (ii), and the other of the first line or the second line of said one of the first loop coils having the common extraction line is disposed in parallel with and close to the common extraction line.

2. The sensor of an electromagnetic induction type coordinate input device according to claim 1, wherein the first line of the first extraction line portion is a line through which a signal is supplied or a signal is taken out, and the second line of the first extraction line portion is a line which is connected to a reference electric potential; and
    the second line of the first extraction line portion of said one of the first loop coils is connected to at least one of: (i) the second line of the first extraction line portion of another one of the first loop coils, and (ii) a line of the second loop portion of one of the second loop coils, to form a common extraction line with (i) and/or (ii), and the first line of said one of the first loop coils having the common extraction line is disposed in parallel with and close to the common extraction line.

3. The sensor of an electromagnetic induction type coordinate input device according to claim 1, wherein at least a portion of the first loop portions of the first loop coils which extend to intersect with the first direction is formed on a first surface of a substrate, the first extraction line portions are formed on a second surface on a side opposite to the first surface of the substrate, and the first extraction line portions and the first loop portions are connected to each other via through holes provided in the substrate; and
    at least a portion of the second loop portions of the second loop coils which extend to intersect with the second direction is formed on the second surface of the substrate, and a connection between said one of the first line or the second line of one of the first loop coils and at least one of: (i) the first line or the second line of another one of the first loop coils and (ii) a line of the second loop portion of one of the second loop coils is formed on the second surface of the substrate.

4. The sensor of an electromagnetic induction type coordinate input device according to claim 1, wherein two or more second lines of the first extraction line portions of the two or more first loop coils of the first loop coil group are commonly connected to the second line of the first extraction line portion of another one of the first loop coils of the first loop coil group, within the position detection area, to form a common extraction line, and two or more first lines of the two or more first loop coils sharing the common extraction line are disposed in parallel with the common extraction line.

5. The sensor of an electromagnetic induction type coordinate input device according to claim 4, wherein the two or more first lines of the first extraction line portions of the two or more first loop coils sharing the common extraction line, which are disposed in parallel with the common extraction line, are alternately arranged on both sides of the common extraction line with the common extraction line located at a center.

6. The sensor of an electromagnetic induction type coordinate input device according to claim 4, wherein the plural first loop coils of the first loop coil group are divided into plural groups, and the second lines of the first extraction line portions of the first loop coils in each of the plural groups are made into a common extraction line.

7. The sensor of an electromagnetic induction type coordinate input device according to claim 4, wherein the two or more second lines of the first extraction line portions of the two or more first loop coils are connected to the second loop portion(s) of the second loop coil(s), within the position detection area, to commonly use line(s) of the second loop portion(s) as common extraction line(s), and the two or more first lines of the first extraction line portions of the two or more first loop coils are disposed in parallel with the common extraction line(s).

8. The sensor of an electromagnetic induction type coordinate input device according to claim 1, wherein the plural first loop coils of the first loop coil group overlap one another, and the plural second loop coils of the second loop coil group overlap one another.

9. The sensor of an electromagnetic induction type coordinate input device according to claim 1, wherein the first extraction line portions and the second extraction line portions are both disposed in parallel with the first direction and are both connected to one connector portion.

\* \* \* \* \*